USO11339564B1

(12) United States Patent
Hedgepeth

(10) Patent No.: US 11,339,564 B1
(45) Date of Patent: May 24, 2022

(54) PURLIN CLIP ASSEMBLY AND SYSTEM

(71) Applicant: Advanced Fastener and Assembly Solutions LLC, Louisburg, NC (US)

(72) Inventor: Alton Craig Hedgepeth, Louisburg, NC (US)

(73) Assignee: Advanced Fastener and Assembly Solutions LLC, Louisburg, NC (US)

(*) Notice: Subject to any disclaimer, the term of this patent is extended or adjusted under 35 U.S.C. 154(b) by 0 days.

(21) Appl. No.: 17/087,694

(22) Filed: Nov. 3, 2020

(51) Int. Cl.
*E04B 1/24* (2006.01)
*F16B 2/24* (2006.01)

(52) U.S. Cl.
CPC ............ *E04B 1/2403* (2013.01); *F16B 2/245* (2013.01); *E04B 2001/2415* (2013.01)

(58) Field of Classification Search
CPC ............ F16B 2/245; E04B 2001/2415; E04B 1/2403; E04B 9/18; E04B 9/225; E04B 1/40; E04B 2009/0492; E04D 3/36; E04D 13/1618; E04D 13/1625; E04D 13/1637; E04F 13/005; E04F 13/0814
USPC .................................. 52/167.1, 506.05–506.8
See application file for complete search history.

(56) References Cited

U.S. PATENT DOCUMENTS

| | | | | |
|---|---|---|---|---|
| 786,598 A | * | 4/1905 | Porten | E04B 1/2403 52/289 |
| 1,775,780 A | * | 9/1930 | Papalas | E04D 3/36 52/489.1 |
| 3,849,012 A | * | 11/1974 | Krouse | E04B 1/2403 403/353 |
| 3,874,035 A | * | 4/1975 | Schuplin | F16B 2/02 248/228.2 |
| 4,263,763 A | * | 4/1981 | Bouwens | E04B 9/001 52/404.3 |
| 4,269,012 A | * | 5/1981 | Mattingly | E04D 3/38 52/394 |
| 4,333,291 A | * | 6/1982 | Musgrave | E04D 3/3602 52/410 |
| 4,333,292 A | * | 6/1982 | Musgrave | E04D 3/3601 52/410 |
| 4,391,075 A | * | 7/1983 | Musgrave | E04D 13/1637 52/404.1 |
| 4,434,601 A | * | 3/1984 | Zellmer | E04D 13/1625 52/745.13 |
| 4,528,790 A | * | 7/1985 | Lo | E04D 13/1637 52/407.4 |
| 4,625,486 A | * | 12/1986 | Dickinson | E04D 13/1637 52/404.1 |

(Continued)

FOREIGN PATENT DOCUMENTS

AU 2013205908 A1 10/2013
CA 2294769 A1 1/1999

(Continued)

*Primary Examiner* — Brian E Glessner
*Assistant Examiner* — Adam G Barlow
(74) *Attorney, Agent, or Firm* — Tuggle Duggins P.A.; Blake P. Hurt

(57) ABSTRACT

A weight-bearing system for hanging items from the roof structure of a metal building is disclosed. The system includes a purlin with at least one flange, a span aperture in the vertical span of the purlin, a clip that attaches to the purlin using the span aperture, and a fastener on the clip for transferring weight applied to the fastener to the clip and to the vertical span of said purlin.

12 Claims, 14 Drawing Sheets

(56) References Cited

U.S. PATENT DOCUMENTS

| | | | | |
|---|---|---|---|---|
| 4,724,651 | A * | 2/1988 | Fligg | E04B 1/7604 52/407.3 |
| 5,357,722 | A * | 10/1994 | Kessler | E04B 7/022 52/302.1 |
| 5,367,848 | A | 11/1994 | McConnohie | |
| 5,405,124 | A * | 4/1995 | Mayer | B25B 5/003 269/45 |
| 5,442,890 | A * | 8/1995 | Fligg | E04B 9/22 52/404.3 |
| 5,535,560 | A * | 7/1996 | Fligg | E04D 13/1637 52/407.3 |
| 5,551,135 | A | 9/1996 | Powers, III | |
| 5,581,966 | A * | 12/1996 | Fligg | E04B 9/303 52/404.3 |
| 5,636,487 | A * | 6/1997 | Fligg | E04D 13/1637 52/404.3 |
| 5,857,292 | A * | 1/1999 | Simpson | E04D 15/04 52/90.2 |
| 5,941,029 | A * | 8/1999 | MacLeod | E04B 9/006 24/336 |
| 6,086,032 | A * | 7/2000 | van Leeuwen | E04B 9/18 248/228.1 |
| 6,240,682 | B1 * | 6/2001 | James | E04B 7/024 52/90.2 |
| 6,470,644 | B2 * | 10/2002 | James | E04B 7/024 52/745.06 |
| 6,880,302 | B1 * | 4/2005 | Fontaine | E04F 13/005 52/273 |
| 7,752,823 | B2 | 7/2010 | Robinson | |
| 7,788,874 | B2 * | 9/2010 | Miller, Jr. | E04D 3/361 24/67.1 |
| 8,327,590 | B2 * | 12/2012 | Ray | E04G 23/0281 52/90.2 |
| 8,371,083 | B2 * | 2/2013 | Chamberlin | E04D 13/1681 52/404.3 |
| 9,322,179 | B2 * | 4/2016 | Oberg | E04D 13/1618 |
| 10,087,633 | B2 * | 10/2018 | Kralic | E04D 3/362 |
| 2005/0066604 | A1 * | 3/2005 | Kinzler | E04B 9/10 52/506.01 |
| 2005/0183368 | A1 | 8/2005 | Morrill | |
| 2006/0096234 | A1 * | 5/2006 | Miller | E04D 3/361 52/712 |
| 2011/0067345 | A1 * | 3/2011 | Crostic, Jr | E04G 21/3266 52/698 |
| 2013/0091782 | A1 * | 4/2013 | Hansen | E04B 1/74 52/63 |
| 2015/0259908 | A1 * | 9/2015 | Pendley | E04B 7/18 52/745.06 |
| 2015/0259935 | A1 * | 9/2015 | McLain | E04D 13/1625 182/138 |
| 2015/0259937 | A1 * | 9/2015 | Pendley | E04G 21/3214 182/138 |

FOREIGN PATENT DOCUMENTS

| | | |
|---|---|---|
| DE | 414566 | 5/1925 |
| EP | 0398812 A1 | 11/1990 |
| FR | 2389725 A1 | 12/1978 |
| FR | 2570403 A1 | 3/1986 |
| FR | 2843988 A1 | 3/2004 |
| GB | 137551 | 1/1920 |
| GB | 559060 | 2/1944 |
| GB | 578832 | 7/1946 |
| GB | 578832 A | 7/1946 |
| GB | 622929 A | 5/1949 |
| GB | 663912 | 12/1951 |
| GB | 665659 | 1/1952 |
| GB | 694784 A | 7/1953 |
| GB | 846103 A | 8/1960 |
| GB | 994673 A | 6/1965 |
| GB | 1534297 A | 11/1978 |
| GB | 2195678 A | 4/1988 |
| WO | 8204087 A1 | 11/1982 |

* cited by examiner

PURLIN CLIP ASSEMBLY AND SYSTEM

BACKGROUND

The invention relates to building structures and is particularly advantageous in prefabricated metal buildings.

As used herein, the term "metal building," typically refers to a steel structure with a steel frame (although sometimes a wood frame) that is easier and faster to build then some other types of construction. Metal buildings also can require less upkeep than buildings made using other materials. Examples include barns, garages, carports, storage buildings and the like. Metal buildings are also used commercially for stores, churches, and schools. Others are used in the agricultural context such as animal barns and crop storage.

Prefabricated metal buildings can be assembled more quickly than conventional structures and often at lower cost. Their footprint can be modified quickly for ease of expansion and flexibility of use. Generally speaking, a steel building can have a longer lifetime than a similar structure made of wood, and the lower fire hazard can make metal buildings less expensive to insure.

The structural elements of many metal buildings include vertical posts to which rafters/struts connect to form parts of the framework for the roof. As used herein, a purlin is a longitudinal member in a roof frame or framing system positioned perpendicularly to the rafters between the plate and the ridge for helping to support the roof. In certain metal buildings the purlins are roughly Z-shaped girders formed of a web or span that orients vertically in construction and two flanges which extend at 900 from the web in opposite directions from one another.

In many circumstances (including some required by building codes) insulation is placed into the roof structure between the purlins and resting on a ceiling sheet, typically a synthetic fabric material. Thus, from the perspective inside the building, the sheet forms the ceiling and hides the purlins, the insulation, and the other parts of the roof structure Because of the various uses for metal buildings, however, a need often exists to hang various items from the ceiling (e.g., loudspeakers, lighting, HVAC components), which in turn means hanging those items from the roof structure behind the roof fabric. In one conventional method, this is typically done by puncturing the fabric ceiling at the intended location, and then driving (e.g.) self-tapping screws into the roof structure. This is generally unsatisfactory for several reasons including the exploratory nature of puncturing the ceiling fabric and the fact that many users take the shortcut of hanging a clip from the flange of the purlin, with the flange being the weakest point of the roof structure. In some cases, hanging items from a purlin flange violates building codes.

As another problem, the desired or necessary amount of insulation required in any given circumstance (e.g., local climate; expected purpose for the building) can make a current pre-engineered metal roof structure unattractive or simply inappropriate. In particular, because either glass wool or foam board insulation provides only about R-3 to R-5 per inch of thickness, the amount of insulation required to reach (e.g.) R-60 may be either unworkable or disadvantageous in current pre-engineered metal structures.

Thus a need exists for a more efficient method of using a roof structure under a fabric ceiling, for avoiding excessive weight on purlin flanges, for positioning hanging items from stronger portions of the roof structure, and for avoiding unnecessary or excess openings in a fabric ceiling.

SUMMARY

In one aspect the invention is a weight-bearing system for hanging items from the roof structure of a metal building. The system includes a purlin with at least one flange, a span aperture in the vertical span of the purlin, a clip that attaches to the purlin using the span aperture, and a fastener on the clip for transferring weight applied to the fastener to the clip and to the vertical span of said purlin.

In another aspect the invention is a method for hanging items inside of metal buildings. The method includes the steps of positioning a plurality of purlin-supported fasteners against the roof side of the fabric ceiling of a metal building in a manner that urges the fasteners directly into contact with the fabrics. Thereafter, and starting from a position inside the building and below the fabric ceiling, locating at least one of the fasteners underneath the fabric ceiling that are contacting the fabric and hanging a weighted item from the at least one located fastener.

In another aspect the invention is a roof structure that includes a plurality of struts supported by vertical posts, a plurality of purlins supported by the struts, a fabric ceiling under the purlins, and a plurality of clips attached to the purlins in which each clip includes a fastener that bears against said fabric ceiling to flex the fabric ceiling at the point of the fastener.

In yet another aspect the invention is an improved system for weight-bearing fixtures in metal buildings. In this aspect the system includes a purlin and a clip attached to the purlin. The purlin includes a vertical span, at least one flange at an oblique angle to the span, and a span aperture defined by the purlin and positioned midway along the vertical span. The clip includes an outer frame formed of an outer base, an outer column extending vertically from the outer base, and an outer finger protruding from the outer column at an oblique angle to the outer column. The clip further include an inner frame inside of the outer frame and formed of an inner base, an inner column extending vertically from the inner base, and an inner finger protruding from the inner column at an oblique angle to the inner column. The inner frame and the outer frame are attached to one another in a manner that permits the inner frame and the outer frame to move with respect to one another a defined distance parallel to the axis of the respective columns, and with the fingers of the inner frame and the outer frame being positioned into and through the span aperture in the purlin.

In yet another aspect the invention is a clip for supporting weight from the roof of a metal building. The clip includes an outer frame formed of an outer base, an outer column extending vertically from the base, and an outer finger protruding from the outer column at an oblique angle to the outer column. The clip also includes an inner frame inside of the outer frame and formed of an inner base, an inner column extending vertically from the inner base, and an inner finger protruding from the column at an oblique angle to the inner column. The inner frame and the outer frame are attached to one another in a manner that permits the inner frame and the outer frame to move with respect to one another a defined distance parallel to the axis of the respective columns.

The foregoing and other objects and advantages of the invention and the manner in which the same are accomplished will become clearer based on the following detailed description taken in conjunction with the accompanying drawings.

DETAILED DESCRIPTION

Figure 1:
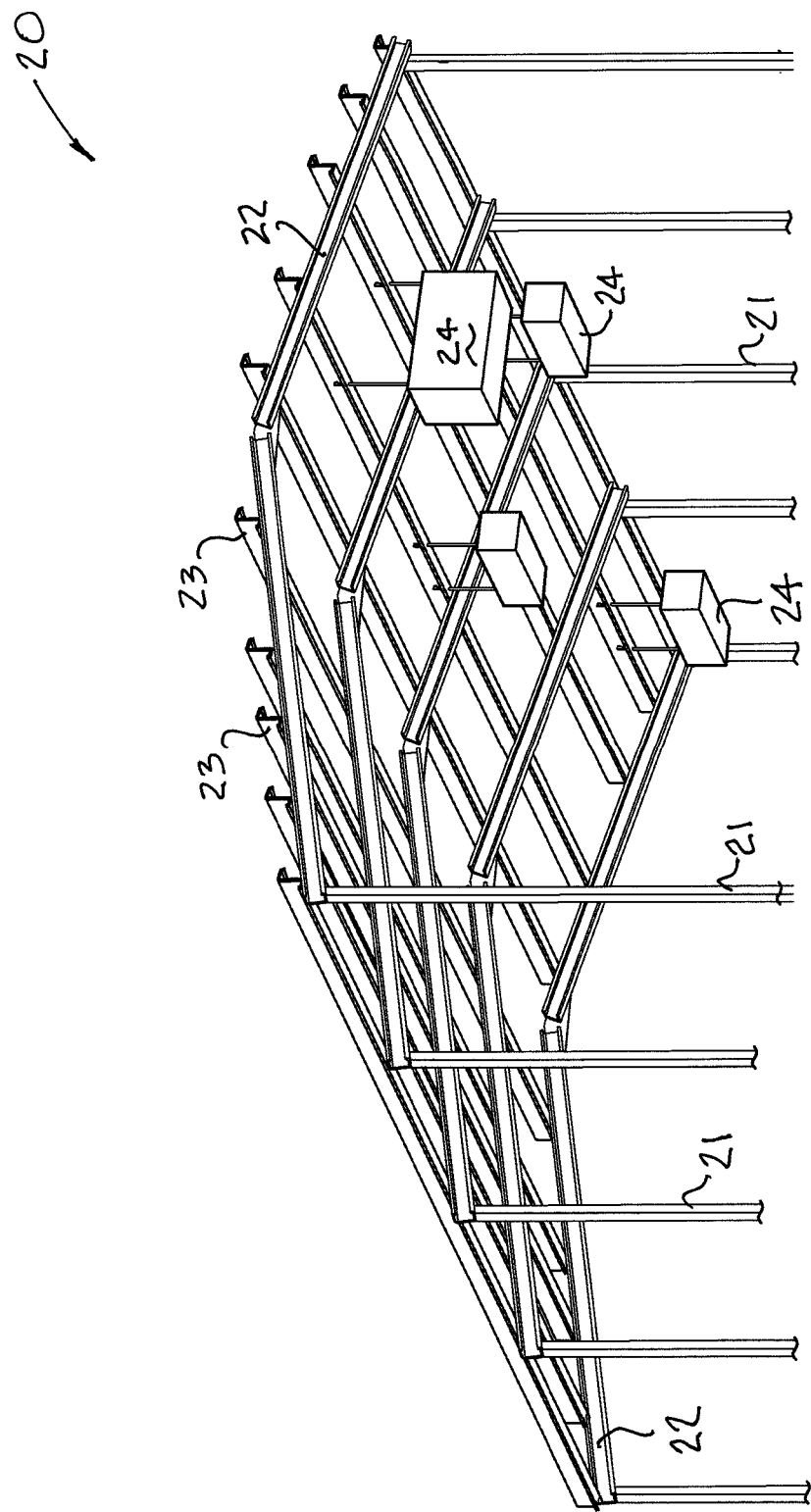
FIG. 1 is a partial perspective view of an exemplary framework for a metal building.

FIG. 1 illustrates in general upper portions of a roof structure 20. The structure is formed from a plurality of vertical posts 21, a plurality of struts 22 supported by the vertical posts 21, and which in turn support a plurality of purlins 23. As set forth in the background, because of the multitude of uses and flexibility provided by metal buildings of this type, FIG. 1 also illustrates several appliances 24 supported by the purlins 23.

Figure 2:
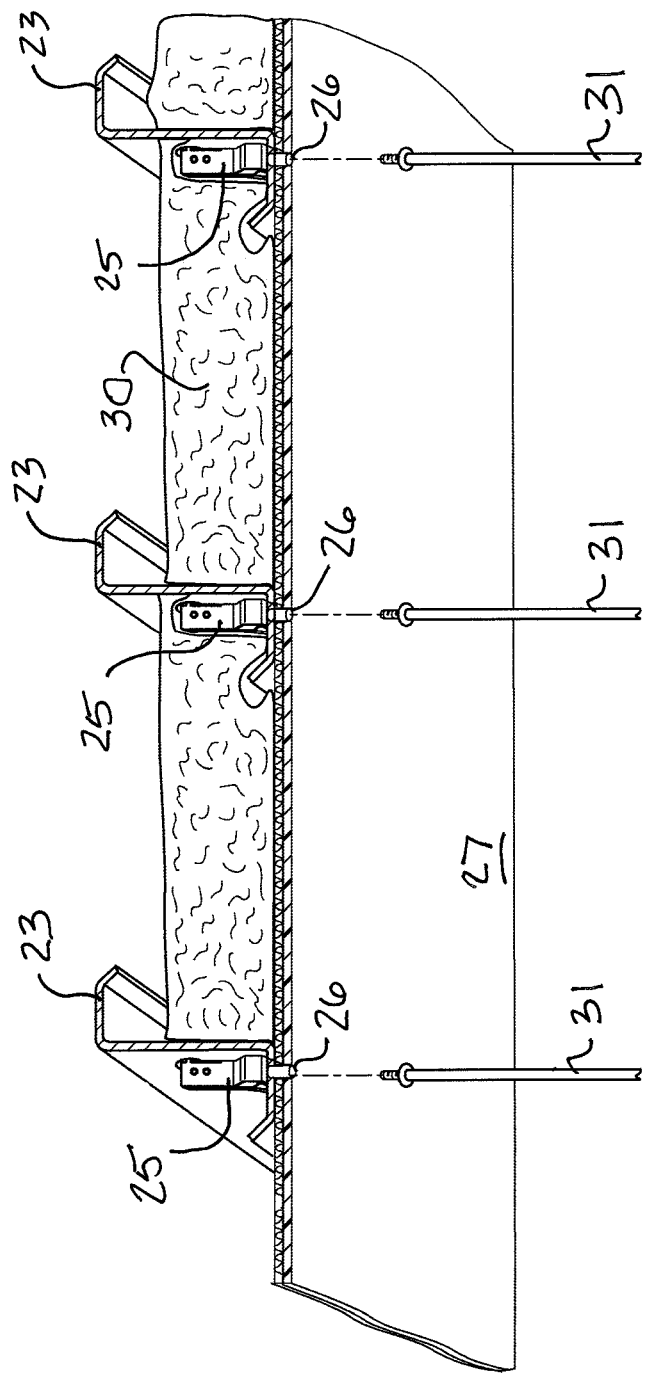
FIG. 2 is a perspective view of the clip and purlin of present invention in an environmental setting.

FIG. 2 is a cutaway view of a roof structure in a metal building that incorporates a plurality of clips 25 that are attached to respective purlins 23. Each clip includes a fastener 26 as part of the clip 25 and in which (e.g. FIG. 3) the fastener 26 depends from the clip 25 so that the fastener 26 bears against the fabric ceiling 27 to flex or tent the ceiling fabric at the position of the fastener 26. FIG. 2 also illustrates some insulation 30 which is almost always present in any metal building that is expected to be used for a public purpose (auditorium, school, gymnasium, etc.) both to add comfort to the users and make any use of heating, ventilation and air conditioning systems more efficient.

As is generally well understood in the art, the fabric ceiling 27 is typically held in place by longitudinal banding parallel to the purlins 23 combined with transverse banding perpendicular to the purlins. In general, the spacing and position of the longitudinal banding will depend on the spacing between purlins, and the transverse banding will be positioned to create generally equal segments and with at least some banding close to any roof edges.

As will be seen in several of the illustrations, the fasteners 26 are illustrated as a T-nut of the type that has interior female threads. Based on this, FIG. 2 illustrates a plurality of hanger bolts 31 that can engage the fasteners 26 and from which appliances 24 such as those illustrated in FIG. 1 can be suspended.

Figure 3:
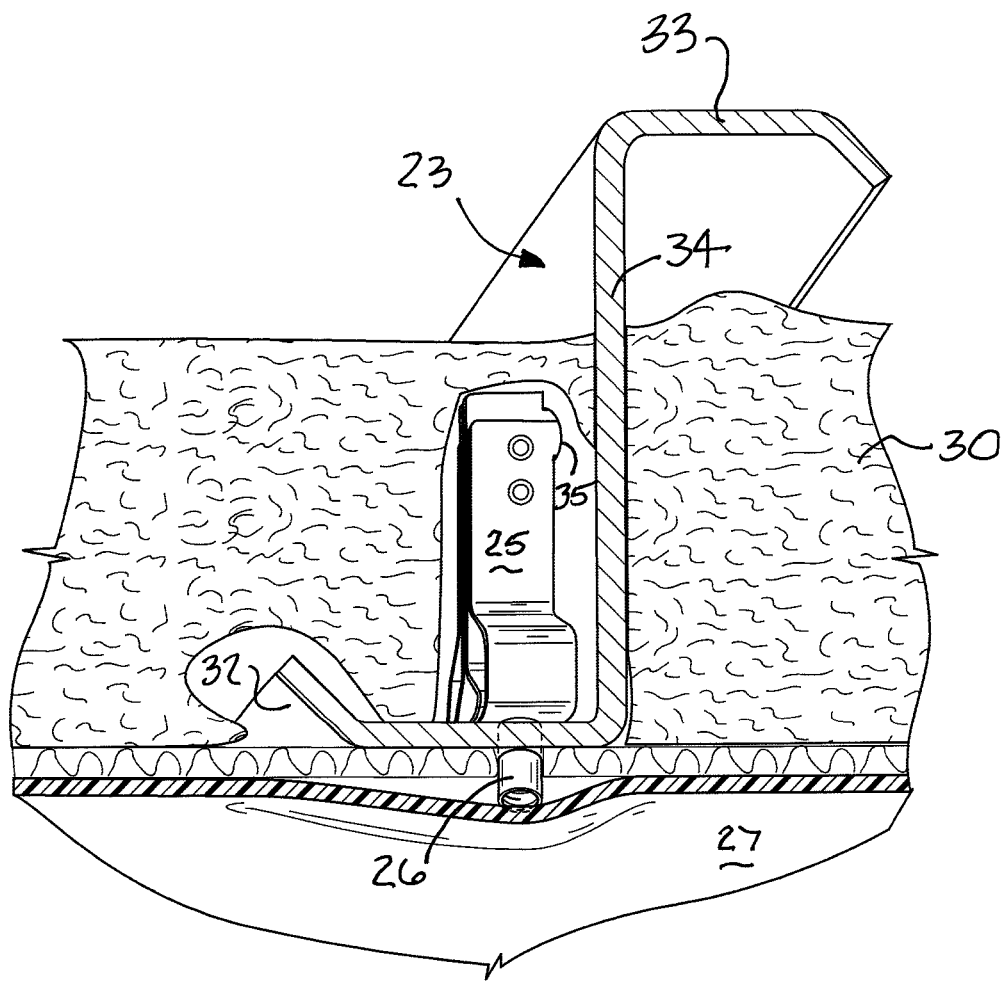
FIG. 3 is an enlarged cutaway view of the clip, a purlin, the fastener and the fastener bearing against the fabric ceiling.

FIG. 3 illustrates aspects of the invention in greater detail. FIG. 3 illustrates a purlin 23 which includes at least one flange 32 positioned near the ceiling fabric 27, and a second flange 33 at the top of the purlin, with a span 34 between the flanges 32 and 33. A span aperture 35 (illustrated in larger scale in FIG. 7), is in the vertical span 34 of the purlin. A flange aperture 36 (FIG. 7) is in the flange 32 at the ceiling. The clip 25 attaches to the purlin 23 using both of the apertures 35 and 36. The fastener 26 depends from the clip 25 and serves to transfer weight applied to the fastener 26 to the clip 25 and in turn to the (strong) vertical span of the purlin.

As FIG. 3 makes evident, and one of the disadvantages of the prior art, if the weight of a hanging object were supported only by the flange 32, the weight-bearing capacity would be greatly reduced as compared to the combination of the clip attached to the vertical span 34 of the purlin 23.

FIG. 3 also illustrates that the fastener 26 depends through the flange aperture 36 in the purlin. In the illustrated embodiment the fastener is a T-nut 26 and (as just referenced with respect to FIG. 2), threaded bolts 31 can be inserted into the T-nut 26 and an appliance 24 can be suspended from the threaded bolt 31.

As will be further described with respect to (e.g.) FIGS. 12-19 the purlin 23 can include a second span aperture 37 in the span of the purlin 23 and with the clip 55 attached to both of the span apertures 35 and 37.

As best illustrated in FIGS. 4-11, the clip 25 includes a plurality of fingers (to be described further herein) for engaging each of the span apertures 35 and 37.

FIG. 3 also illustrates an important aspect and advantage of using the invention. The plurality of purlin 23-supported fasteners 26 can be positioned against the roof side of the fabric ceiling 27 of the roof structure 20 in a manner that urges the fasteners 26 directly into contact with the fabric 27. FIG. 3 shows this as the tent or flex in the fabric 27 at the T-nut 26. With the fabric 27 bearing directly against the fasteners 26, and starting from a position inside the metal building and below the fabric ceiling 27, the fasteners can be easily located underneath the fabric ceiling at the positions where they contact the fabric 27, so that a weighted item can be suspended from the located fasteners 26 without the need to explore or open the fabric to find items that are otherwise hidden from view.

FIGS. 4 through 11 illustrate a first embodiment of the clip 25 in more detail. The clip 25 is illustrated in the form of an outer frame 40 and an inner frame 41 with the inner frame 41 inside of the outer frame 40. The outer frame includes an outer base 42 which in the illustrated embodiment is not a separate part, but generally the partially five-sided structure shown in the drawings. An outer column 43 extends vertically (the orientation refers to the position in use) from the outer base and terminates at an outer finger 44 that protrudes or extends from the top of the outer column 43 at an oblique angle (90° as illustrated) to the outer column.

In the illustrated embodiment the outer frame 40 has two parallel columns 43 and two of the outer fingers 44. A pair of rivets 45 (at least one extends through the outer column 43.

The inner frame 41 is inside of the outer frame 40 and is formed of and inner frame base 46 which again represents a portion of the inner frame 41 rather than a separate element and is illustrated in a generally triangular shape. An inner column 47 (two are illustrated) extends vertically from the inner frame base 46 and likewise terminates in an inner finger 50 (two are shown) at an oblique angle (also illustrated as 90°) from the inner column. The inner frame 41 and the outer frame 40 are attached to one another in a manner that permits the inner frame 41 and outer frame 40 to move with respect to one another a defined distance parallel to the axis of the respective outer 43 and inner 47 columns. As best illustrated in FIGS. 8-11 the fingers 44 and 50 of the inner and outer frames 41, 40 are positioned into and through the span aperture 35 in the span 34 of the purlin 23.

Figure 6:
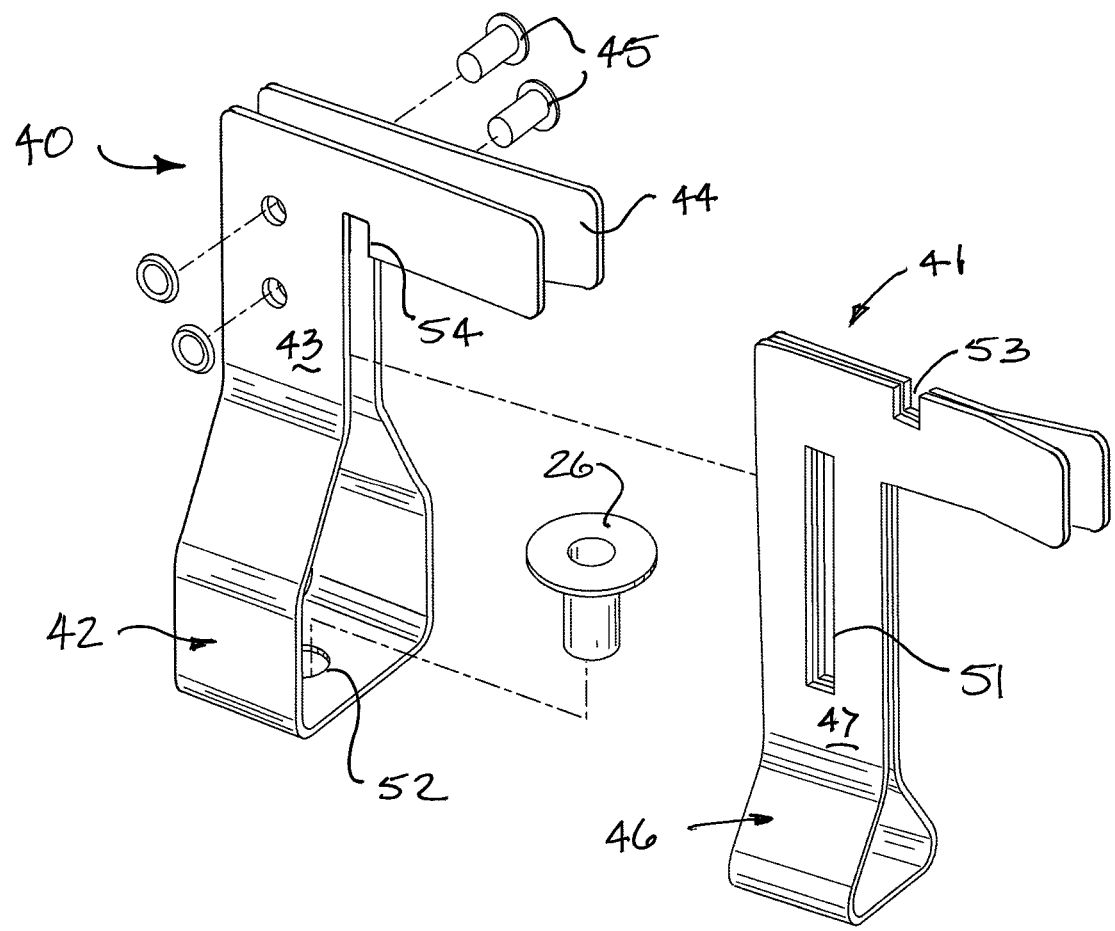
FIG. 6 is an exploded view of one embodiment of a clip according to the invention.

FIG. 6 is an exploded view of the clip 25 that helps illustrate the structure and function of the clip 25. In particular, FIG. 6 illustrates a rivet slot 51 in the inner column 47 that together with the rivets 45 permits the movement of the inner frame 41 and the outer frame 40 with respect to one another.

FIG. 6 also illustrates the fastener 26, again in the form of a T-nut which is positioned in a fastener opening 52 in the outer base 42.

Figure 7:
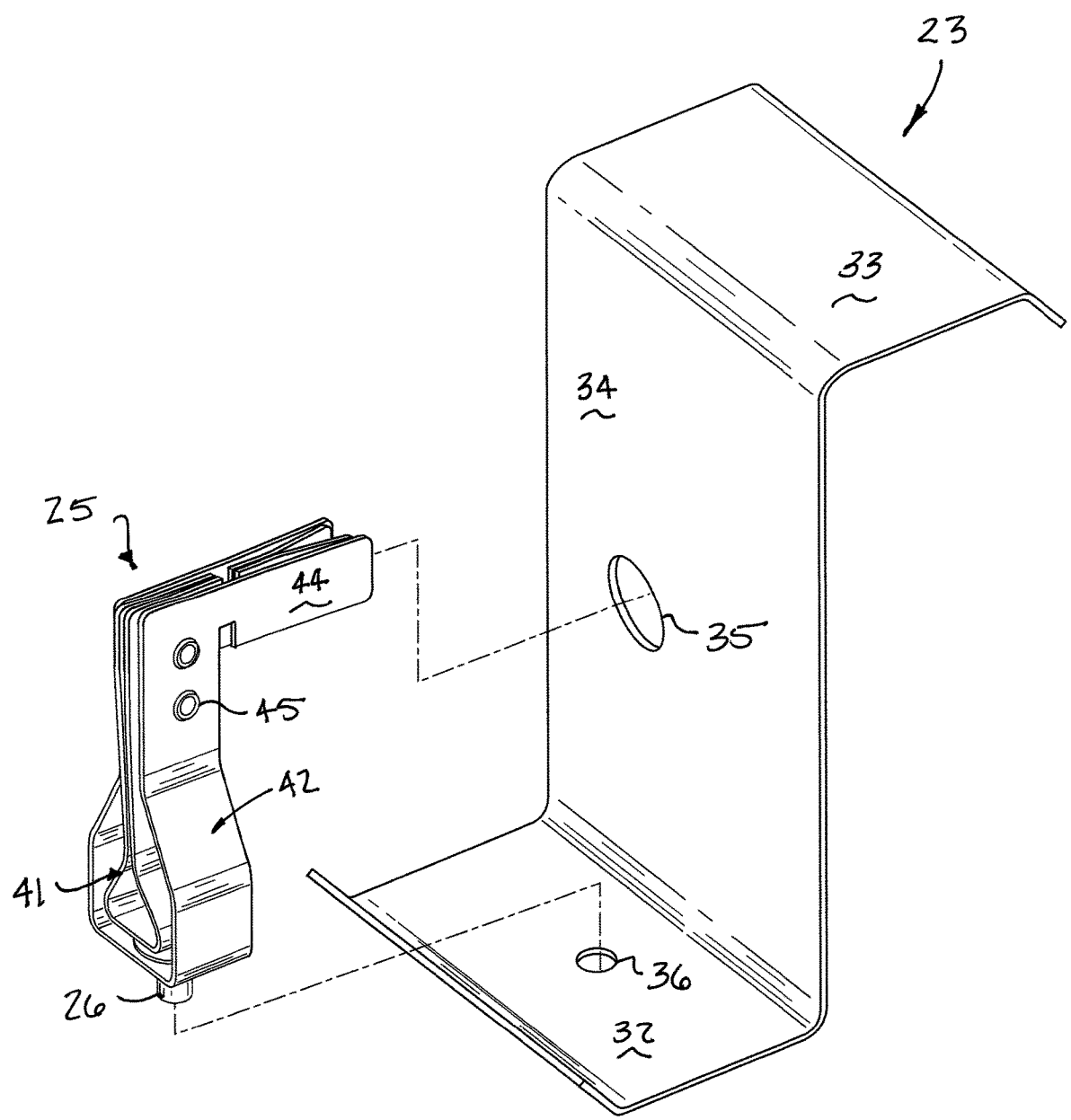
FIG. 7 is a perspective exploded view illustrating a segment of the purlin and a clip.

FIG. 7 is an exploded view of the clip 25 and the purlin 23. The purlin includes the flanges 32 and 33, the span 34, and the span aperture 35. FIG. 7 illustrates that when the fingers 44 and 50 are positioned into and through the span aperture 35, the fastener 26 that depends from the outer base 42 projects through the flange aperture 36.

Figure 8:
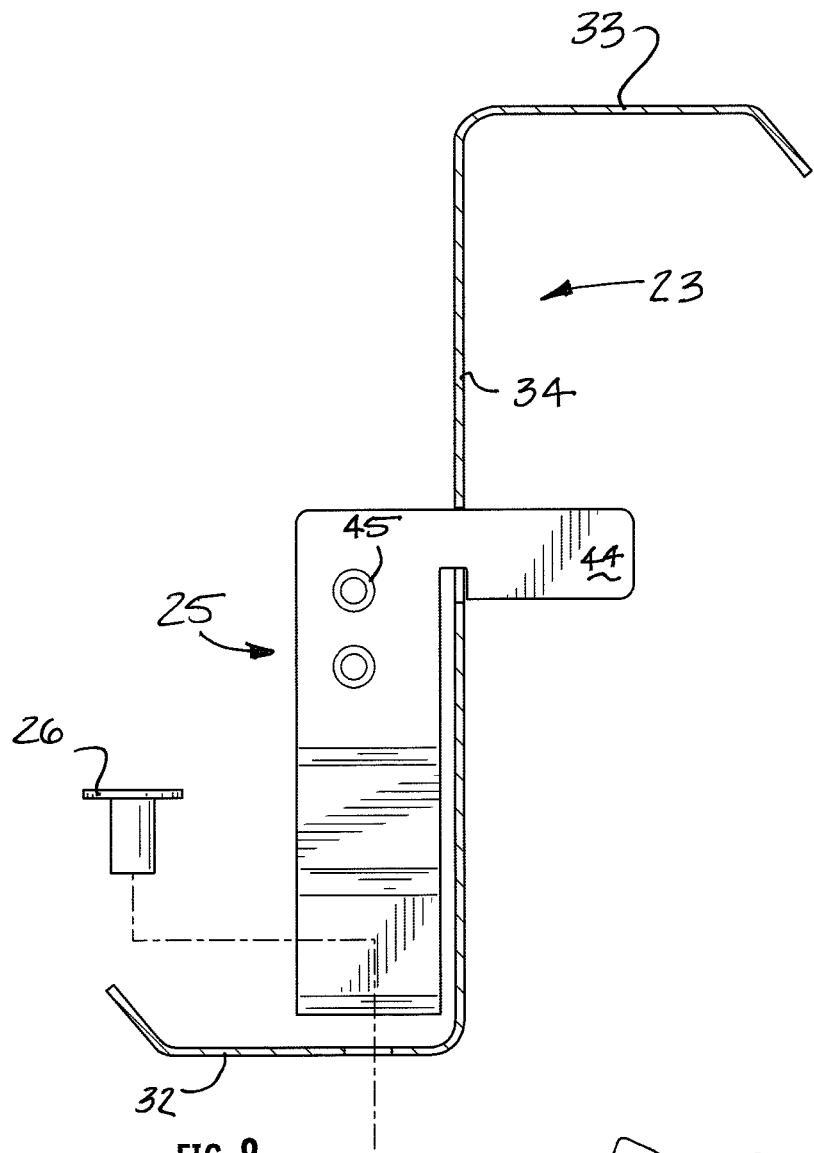
FIG. 8 is a side elevational view of the clip as inserted into the purlin
Figure 9:
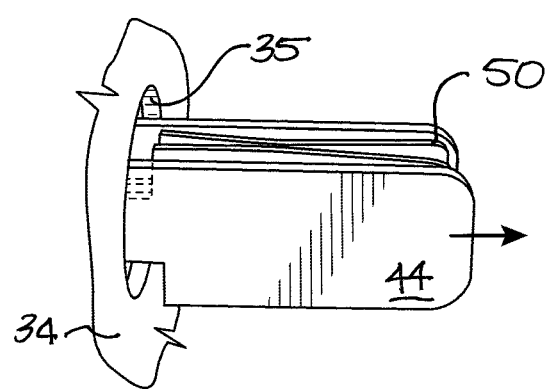
FIG. 9 is a perspective view of a portion of the clip that passes through the purlin.

FIGS. 8 and 9 illustrate aspects of the relationship between the clip 25 and the purlin 23 when the fingers 44 and 50 have been inserted through the span aperture 35. FIGS. 8 and 9 illustrate a position referred to as "closed" meaning that the inner and outer frames are in a position that minimizes the axial length of the clip 25 and allows the fingers 44 and 50 be inserted through the span aperture 35.

FIG. 9 is an enlarged view of the fingers 44 and 50 extending through the span aperture 35 and further illustrates that the fingers can include a flexed portion that provides a spring force in which the inner fingers 50 push against the outer fingers 44. For clarity, FIG. 9 refrains from illustrating a small portion of the finger 50.

Figure 10:
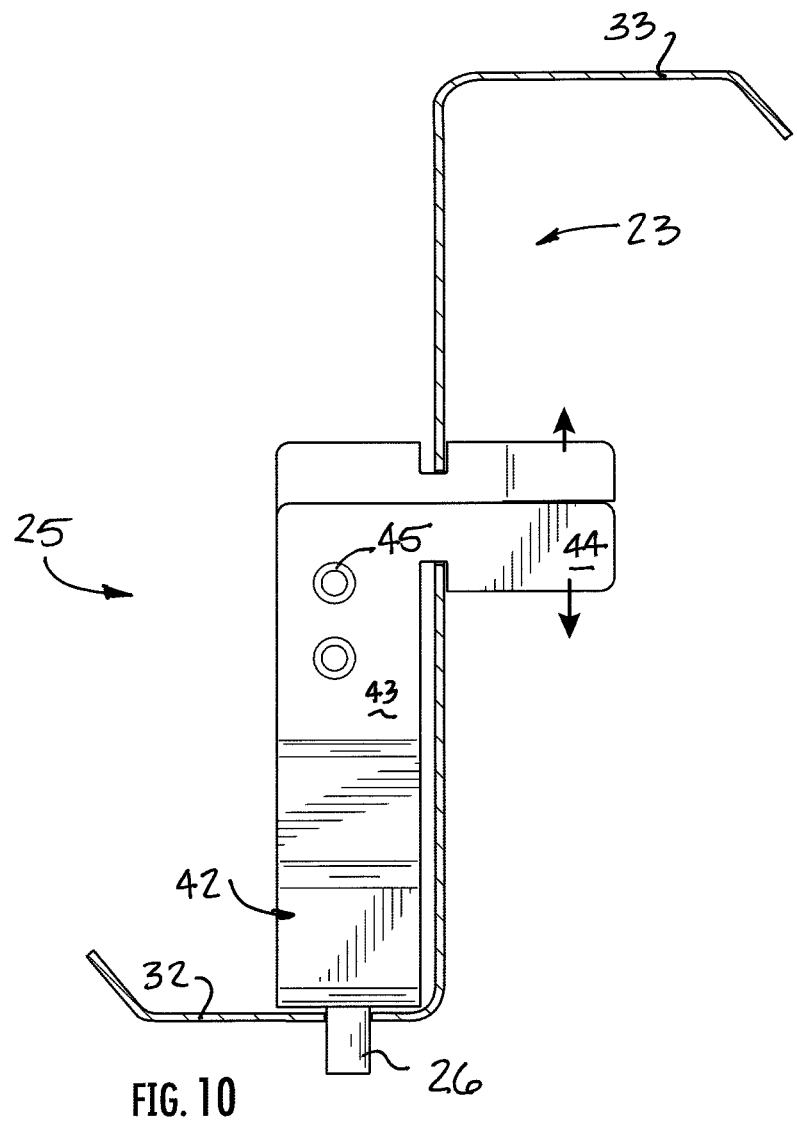
FIG. 10 is a side elevational view similar to FIG. 7 but showing the clip in the open orientation in which it grips the purlin.
Figure 11:
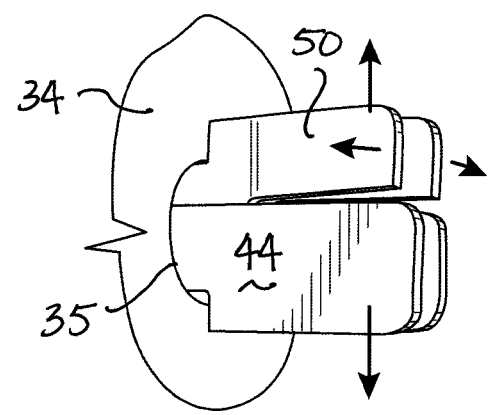
FIG. 11 is a view similar to FIG. 8, but showing the open the position of FIG. 10.

FIGS. 10 and 11 are very similar to FIGS. 8 and 9, but show the clip 25 in an open position with respect to the purlin 23 and particularly with respect to the span aperture 35. To change from the orientation of FIGS. 8 and 9 to that of FIGS. 10 and 11, the user, after having inserted the fingers 44, 50 can use the base portions 42 and 46 to physically slide the inner frame upwardly (again in the orientation of use) to engage opposite portions of the circumference of the span aperture 35. In the illustrated embodiment inner finger notches 53 and outer finger notches 54 engage the span aperture 35 to help fix the clip 25 in position with respect to the purlin 23. In this position the fastener 26 extends through the flange aperture 36 to form a position over which the fabric ceiling 27 can flex for the purpose described (locating the fastener 26) with respect to FIG. 3.

Figure 12:
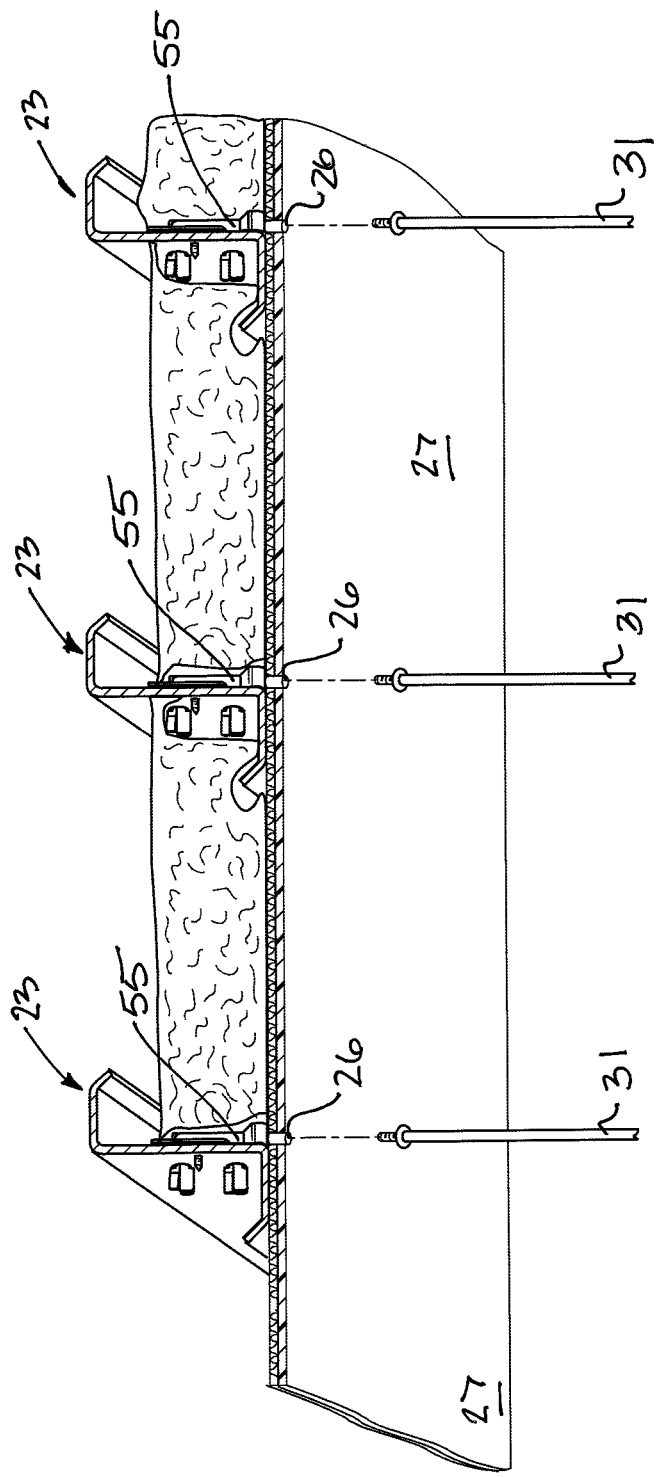
FIG. 12 is a perspective view of a second embodiment of the clip and purlin of present invention in an environmental setting.

FIG. 12 is a cutaway perspective view analogous to FIG. 2, but showing the use of a second embodiment of the clip broadly designated at 55. As FIG. 12 illustrates, the second embodiment clip 55 can be used independently of the presence of a flange aperture 36, although it will be understood that if a flange aperture is present, the second embodiment of the clip can be used with or without the flange aperture 36. Thus, in FIG. 12 the fastener 26 simply depends toward the ceiling fabric 27 without passing through any flange aperture 36. This gives a flexible option for reducing the number of flange openings, either partially or completely, in the purlin 23.

Figure 4:
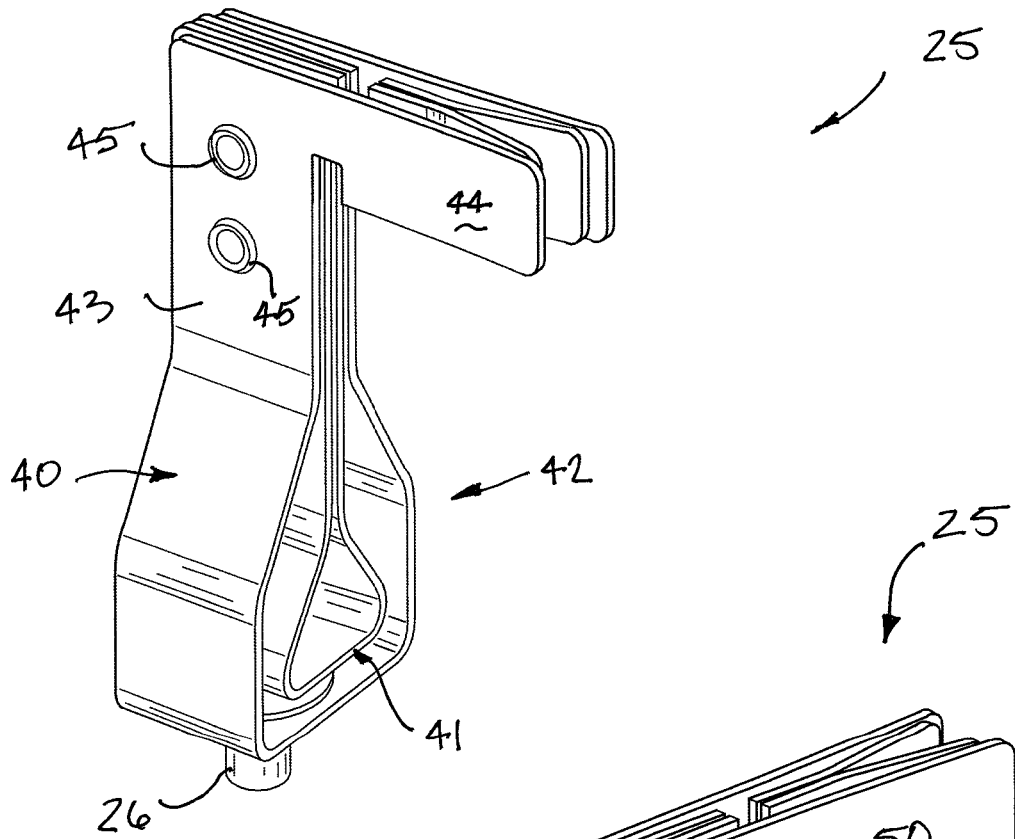
FIGS. 4 and 5 are opposite perspective views of one embodiment of a clip according to the invention.
Figure 5:
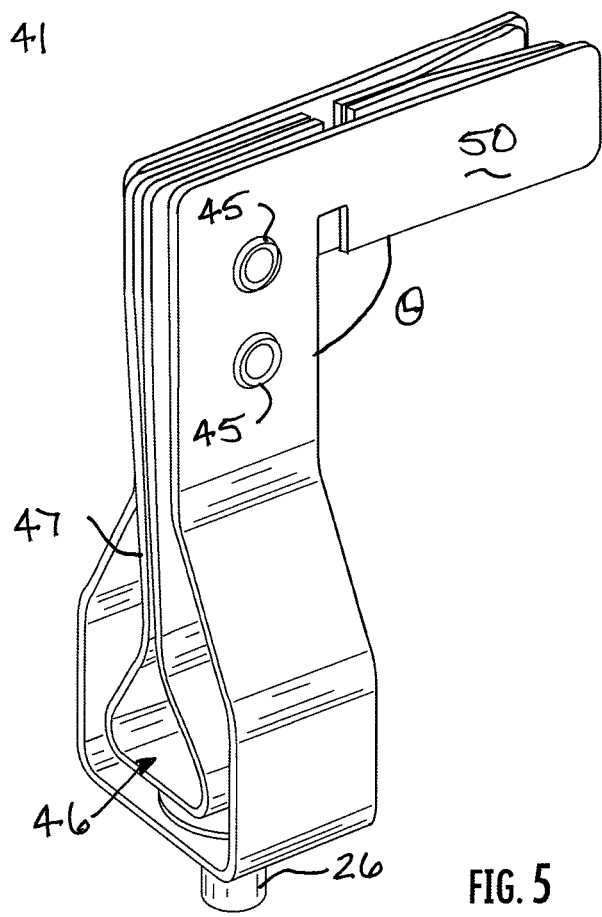
Figure 13:
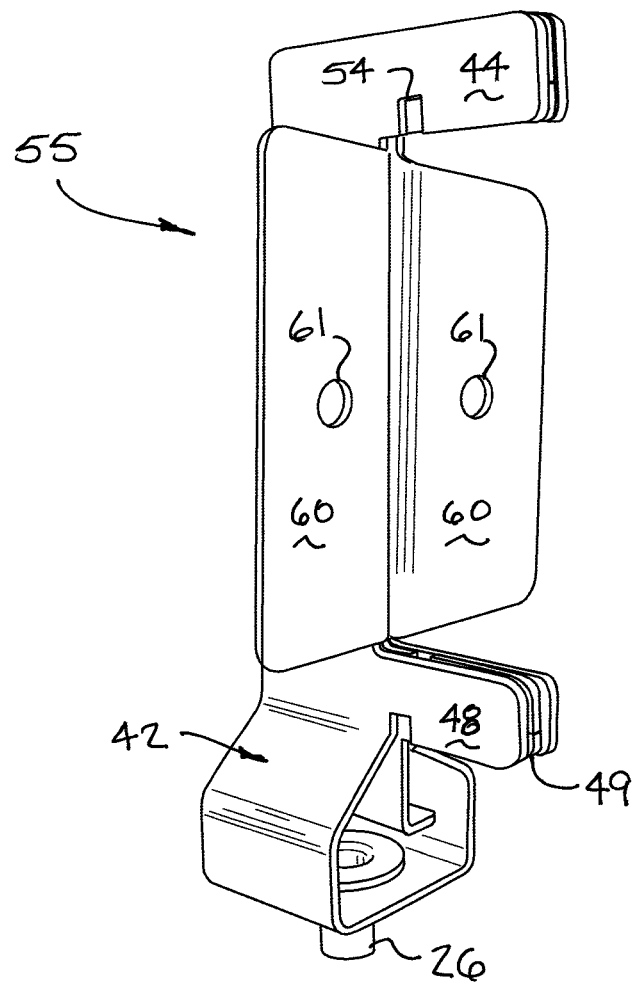
FIGS. 13 and 14 are perspective views of a second embodiment of a clip according to the invention in the closed position.
Figure 14:
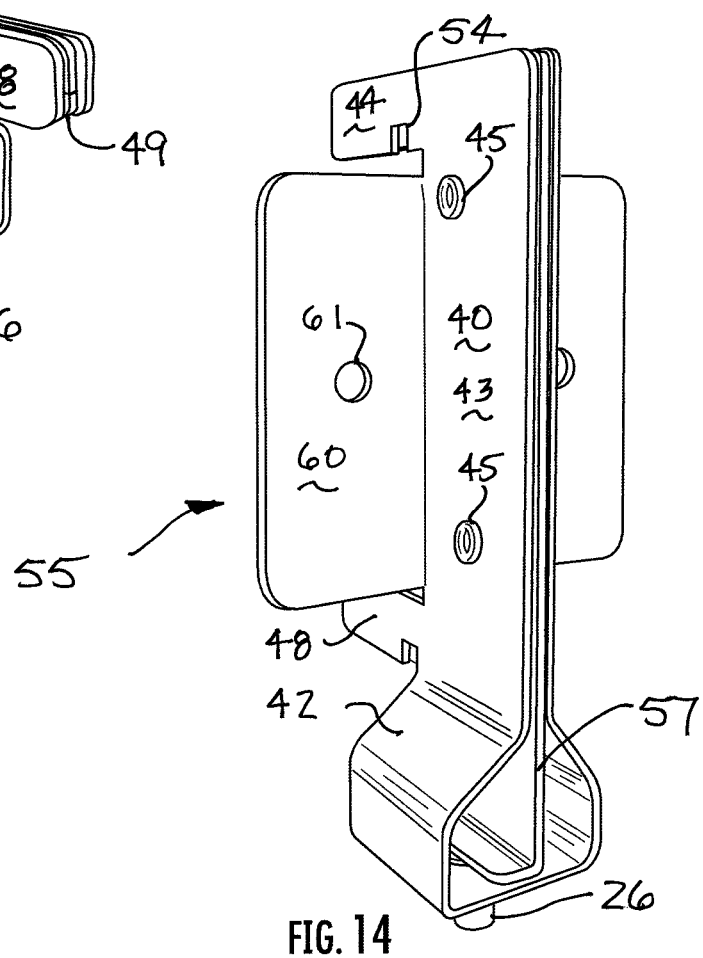
Figure 18:
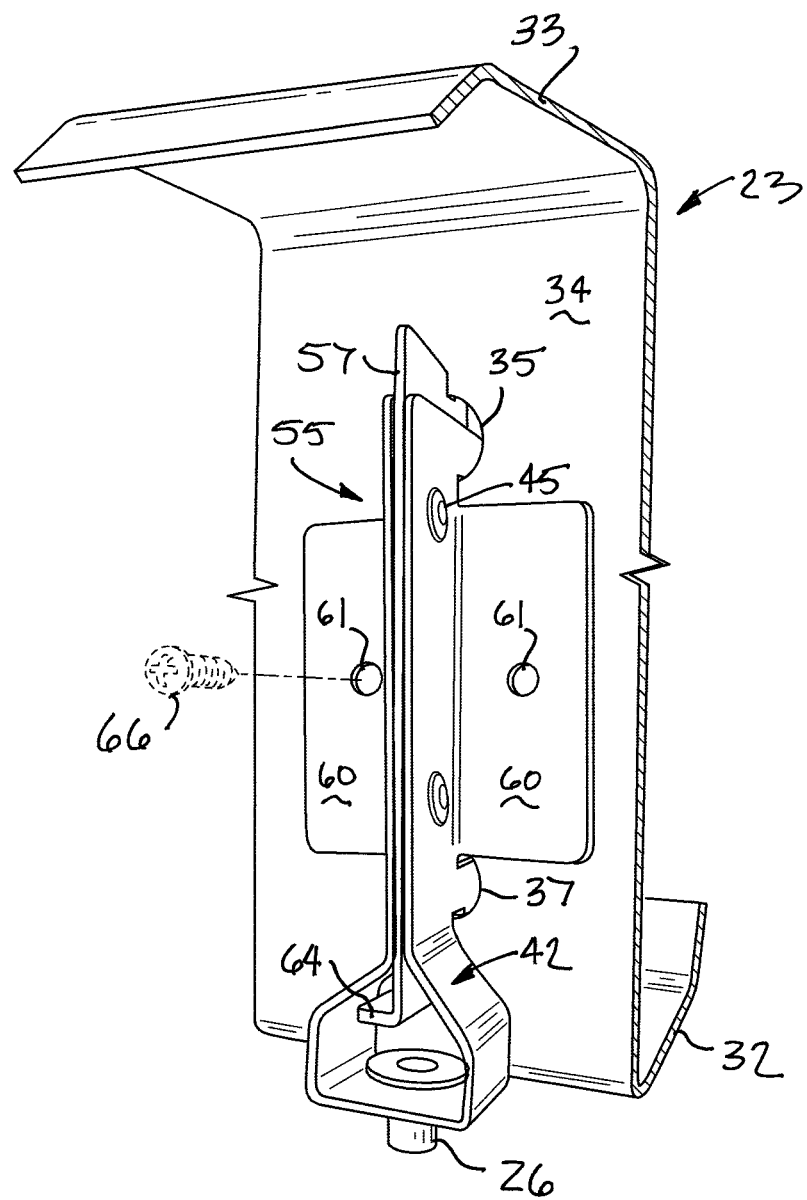
FIGS. 18 and 19 are respective perspective views of the second embodiment of the clip inserted into the web portion of the purlin.

FIGS. 13 and 14 are analogous to FIGS. 4 and 5 in showing the second embodiment of the clip in a "closed" position. The second embodiment is formed of a single inner column 57 in an outer frame 40 substantially the same as the outer frame in the first embodiment, and with at least one (and two are shown) clip flanges 60 extending perpendicularly from the column 43 of the outer frame 40. Each clip flange 60 has a clip flange hole 61 which can be used as one method of fastening the clip flanges 60 to the span 34 of a purlin 23. A second outer finger 48 is position near the outer base 42 and defines a spacing between the outer fingers 44 and 48 that substantially matches the spacing of the two span apertures 35, 37 (FIG. 18). A second inner finger 49 is likewise positioned near the inner frame base 46 or any equivalent position on the single inner column 57. The spacing of the inner fingers likewise matches the position of the span apertures 35, 37.

Figure 15:
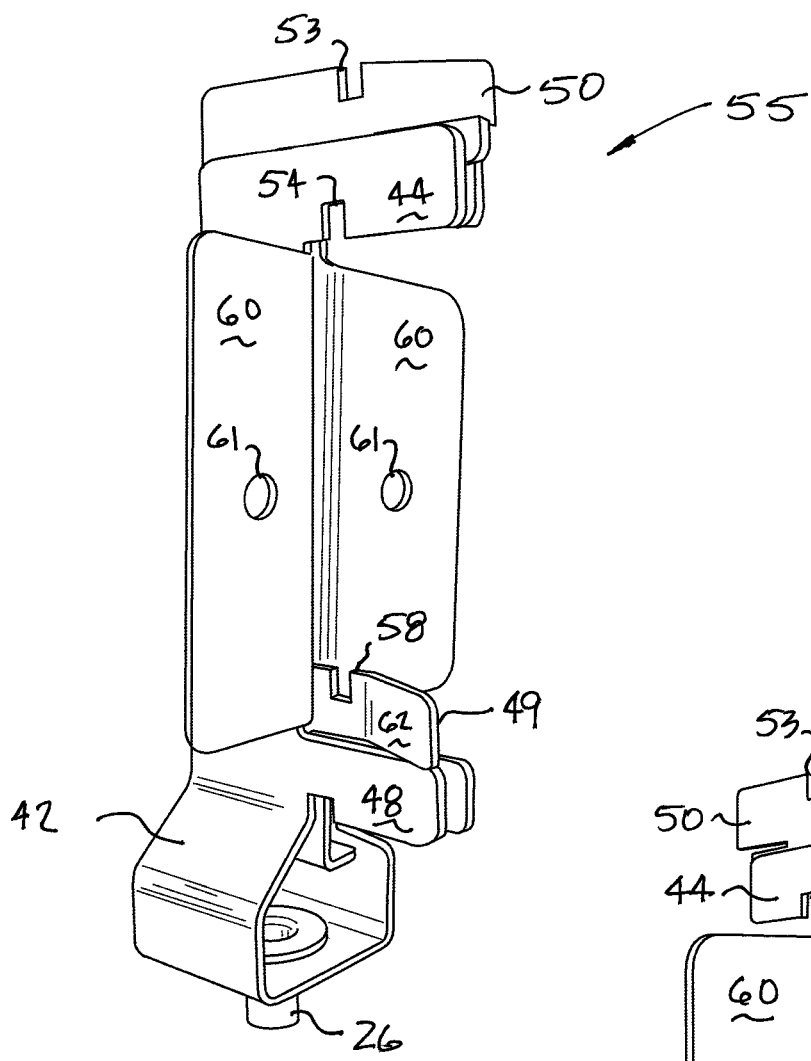
FIGS. 15 and 16 are perspective views of the clip of FIGS. 13 and 14 but now in the opened position.
Figure 16:
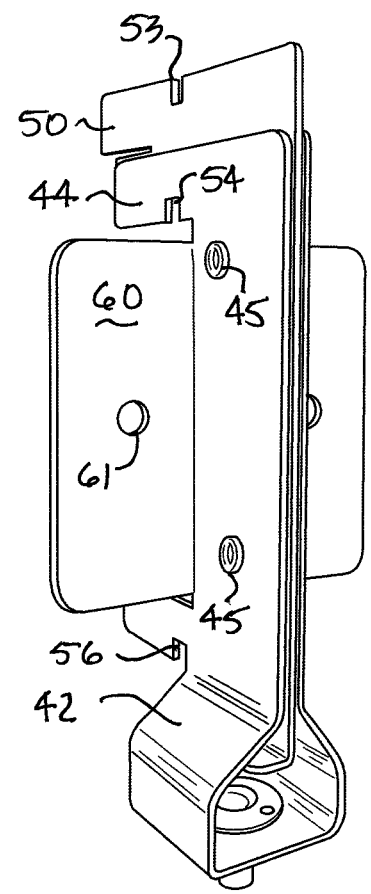

FIGS. 15 and 16 show the second embodiment of the clip 55 in the opened position including the inner finger notches 53 and the outer finger notches 54, each of which action the same manner as described with respect to the first embodiment. FIGS. 15 and 16 also illustrates the flexed portions 62 on the inner finger which can provide a spring force in the same manner as in the first embodiment 25 of the clip. FIGS. 15 and 16 also help illustrate the respective second outer finger notches 56 and the second inner finger notches 58.

Figure 17:
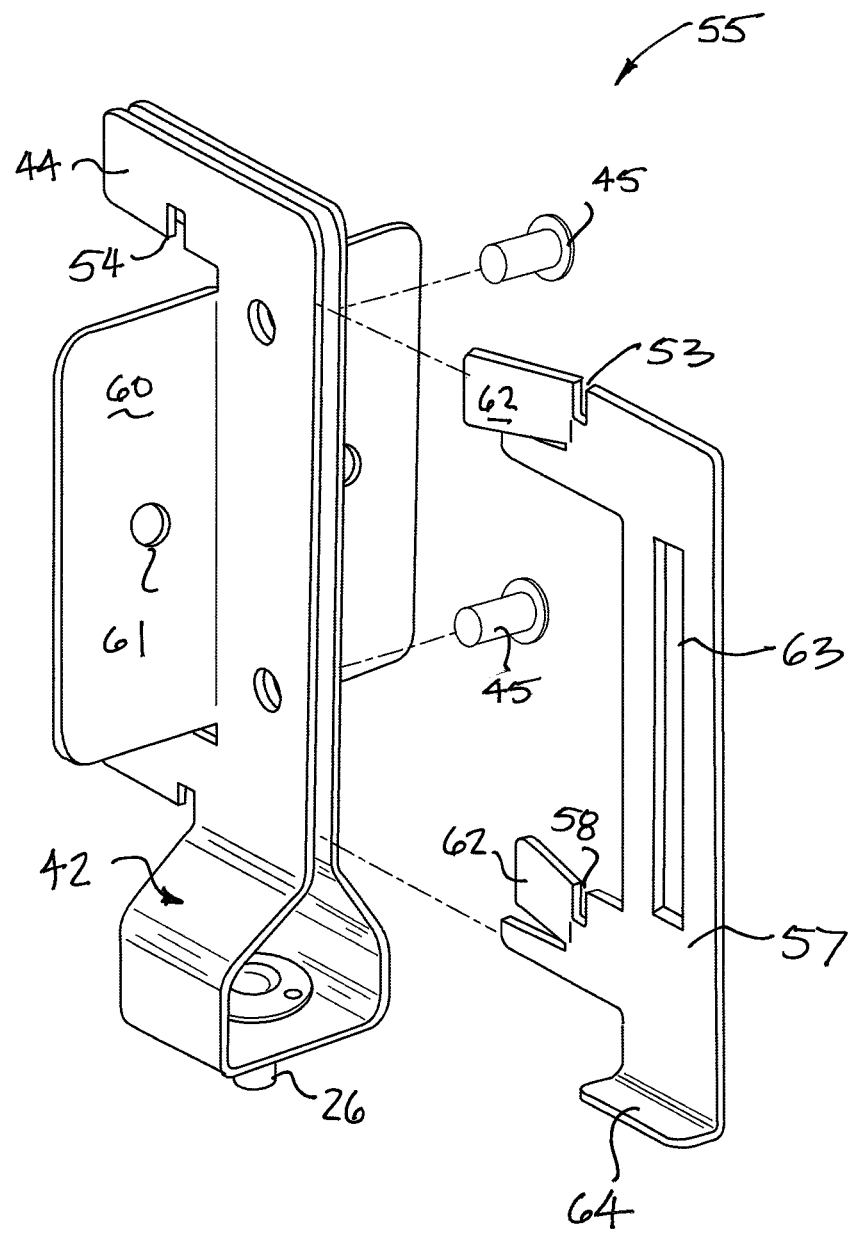
FIG. 17 is a partially exploded view of the second embodiment of the clip.

FIG. 17 is analogous to FIG. 6 and shows the second embodiment of the clip 55 in exploded fashion. In addition to illustrating the single inner column 57, FIG. 17 also shows an extended rivet slot 63 in the single inner column with the extended rivet slot 63 cooperating with the rivets 45 in the same manner as in the first embodiment to allow the movement of the single inner column 57 and the outer frame 40 with respect to one another. FIG. 17 also helps illustrate that the single inner column 57 includes a column tab 64 that gives a user a place of purchase to move the single inner column 57 with respect to the outer frame 40.

Figure 19:
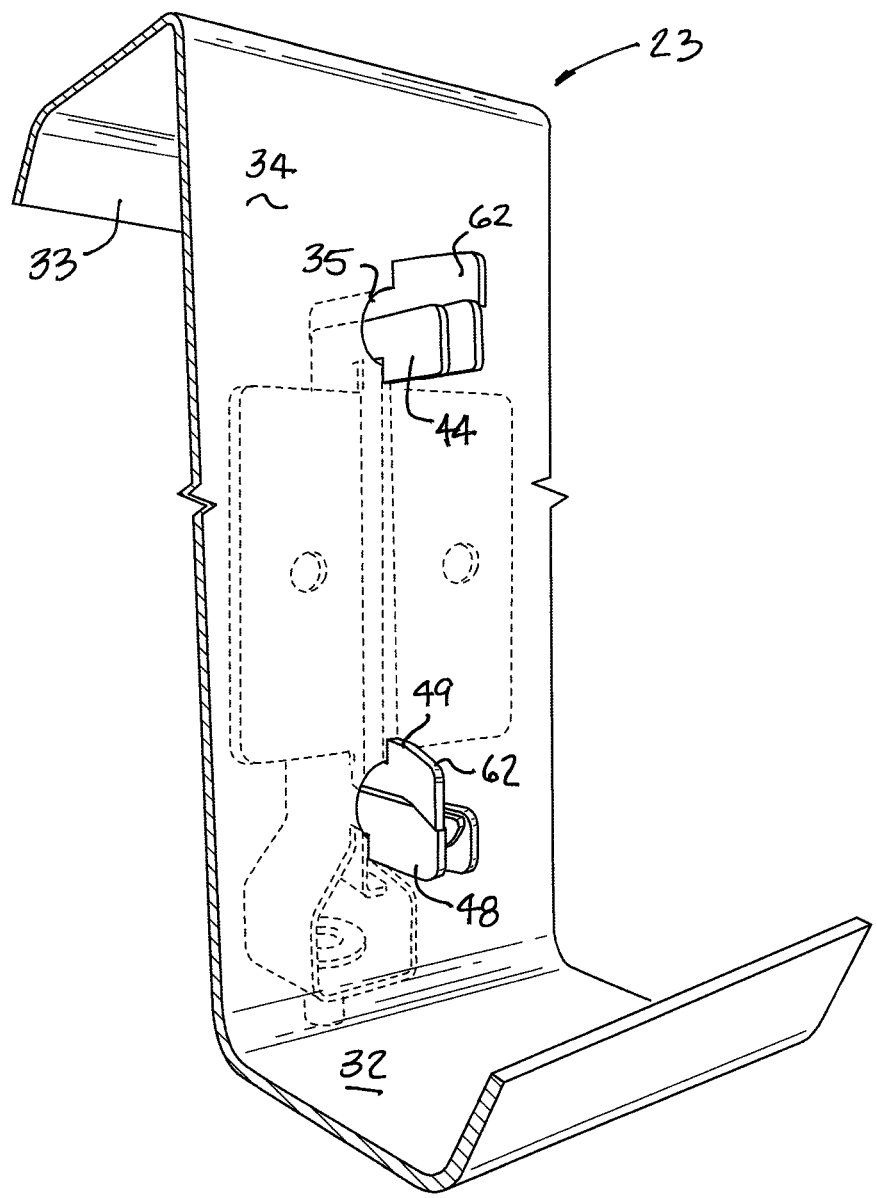

FIGS. 18 and 19 are respective perspective or isometric views of the second embodiment of the clip 55 connected to a purlin 23 and in particular illustrating the use of the clip 55 with respect to the purlin 23 in a manner independent of any flange aperture (e.g. 36 in FIG. 7). Used in this manner, the clip 55 can still be attached to the purlin 23 using the span apertures 35 and 37. Independently of that connection, however, or alternatively combined with the span aperture connection, the second embodiment of the clip 55 can be fastened to the purlin 23 using one or both of the clip flanges 60, the clip flange holes 61 and an appropriate fastener illustrated as the metal screw 66.

Going further, however, the skilled person will understand that if desired or necessary, fastening the clip 55 using the clip flanges 60 offers the capability to attach to a purlin 23 that has no openings whatsoever other than any opening that would be created using (for example) the metal screw 66. In such use, the fingers (e.g., 44, 50) of the clip can be physically removed to allow the remainder of the clip 55 to fit flush or nearly flush against the purlin 23.

The clips 25 and 55 illustrated herein thus can provide significant flexibility in the construction and use of metal buildings. First, because the clips 25, 55 are independent of the purlin, they avoid adding additional manufacturing costs to the purlin itself. Second, because the clips 25, 55 are provided initially independently of the purlins 23, the clips 25, 55 can be located anywhere along the purlin as may be desired or necessary in the circumstances. Clips 25, 55 can be added by the user by having the user form (e.g., drill, cut) the necessary openings in the purlin 23, or purlins can be manufactured with the desired openings at regular or custom spacing. Such choices are economic in nature, rather than any limitation on the invention.

The combination of the clip 25, 55 combined with a perforated purlin 23 places all hanging weight on the web (the strongest part of the purlin) and none on the flanges 32, 33. Additionally, because the fastener 26 rests gently against the vapor barrier ceiling 27, the fastener 26 can be located easily by feel.

As another advantage, the fastener 26 on the clip 25, 55 provides the capacity to fix extra insulation in climates or for purposes where a high R-value is required, and where a metal building might otherwise be unacceptable. Exemplary foam board insulation can have a capacity of about R-4 or R-5 per inch (thickness) and glass wool is about R-3 or R-4 per inch. As a result, if (again, for example) R-60 is desired or necessary, 12-15 inches of foam board or 20 inches of glass wool could be required. Using the invention, such thicknesses can be easily suspended in the metal building context by selecting a hanger bolt 31 of a desired length. Additionally, a hanger bolt can terminate in its own fastener so that an appliance can still be supported, all using the strength of the purlin's 23 vertical span 34.

The clip is formed of two sliding parts so that when the sliding parts are completely nested, the clip can be easily added to a perforation in a purlin. The sliding parts can then be adjusted so that the notches 53, 54 engage the opposite sides (noon and 6 o'clock) of the perforation in the purlin. This locks the clip in place and positions the fastener both through the opening in the flange and extending slightly below the flange to touch the fabric barrier for ease of location later.

The clips are used rather than some permanent structure because minimizing weight is important and the use of clips makes the choice of the number of necessary clips in any installation completely optional for maximum design freedom. Because the (typically steel) purlins are manufactured, sold and transported all on the basis of weight, using the clips as an optional separate item adds value to the overall system.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. An improved system for weight-bearing fixtures in metal buildings, said system comprising:
   a purlin and a clip attached to the purlin;
   said purlin comprising
   a vertical span,
   at least one flange at an oblique angle to said span, and
   a span aperture defined by said purlin and positioned midway along said vertical span;
   said clip comprising
   an outer frame formed of
   an outer base,
   an outer column extending vertically from said outer base, and
   an outer finger protruding from said outer column at an oblique angle to said outer column;
   an inner frame inside of said outer frame and formed of
   an inner base,
   a inner column extending vertically from said inner base, and
   an inner finger protruding from said inner column at an oblique angle to said inner column
   said inner frame and said outer frame being attached to one another in a manner that permits said inner frame and said outer frame to move with respect to one another a defined distance parallel to the axis of said respective columns; and
   with the fingers of said inner frame and said outer frame being positioned into and through said span aperture in said purlin.

2. A weight-bearing system according to claim 1 further comprising:
   a flange aperture in said flange and coplanar with said span aperture
   a fastener that depends from said outer base;
   with said fastener projecting through said flange aperture when said fingers are positioned into and through said span aperture.

3. A weight-bearing system according to claim 1 wherein:
   said vertical span includes a second span aperture spaced linearly from said first span aperture;
   said outer finger is positioned at the top of said outer column;
   said outer frame includes a second outer finger positioned near said outer base to thereby define a spacing between said outer fingers that substantially matches the spacing of said two span apertures;
   said inner finger is positioned at the top of said inner column;
   said inner frame includes a second inner finger positioned near said inner base to thereby define a spacing between said inner fingers that substantially matches the spacing of said two span apertures;
   with the fingers of said inner and outer frames respectively in each of said span apertures.

4. A weight-bearing system according to claim 1 and further comprising:
   a clip flange on said clip and perpendicular to said outer and inner columns so that said clip can be fastened to said span independently of said fingers and independently of said span aperture.

5. A weight-bearing system according to claim 4 comprising a clip flange hole in said clip flange so that a fastener in said clip flange hole can fasten said clip to a purlin.

6. A weight-bearing system according to claim 3 wherein said inner finger includes a flexed portion that provides a spring force between said inner and outer fingers.

7. A clip for supporting weight from the roof of a metal building, said clip comprising:
   an outer frame formed of
   an outer base,
   an outer column extending vertically from said base, and
   an outer finger protruding from said outer column at an oblique angle to said outer column;
   an inner frame inside of said outer frame and formed of
   an inner base,
   an inner column extending vertically from said inner base, and
   an inner finger protruding from said column at an oblique angle to said inner column;
   said inner frame and said outer frame being attached to one another in a manner that permits said inner frame and said outer frame to move with respect to one another a defined distance parallel to the axis of said respective columns.

8. A clip for supporting weight according to claim 7 comprising:

two parallel outer columns extending vertically from said outer base with one of said outer fingers on each said outer column.

9. A clip for supporting weight according to claim 7 comprising:
two parallel inner columns extending vertically from said inner base with one of said inner fingers on each said inner column.

10. A clip for supporting weight according to claim 7 further comprising a fastener that depends from said clip.

11. A clip for supporting weight according to claim 7 wherein
said outer frame includes a second outer finger positioned near said outer base to thereby define a spacing between said outer fingers that substantially matches the spacing of said two span apertures
said inner frame includes a second inner finger positioned near said inner base to thereby define a spacing between said inner fingers that substantially matches the spacing of said two span apertures.

12. A clip according to claim 10, and attached to the vertical span of a purlin, and with said depending fastener bearing against the fabric ceiling of a metal building.

\* \* \* \* \*